US012505731B2

(12) United States Patent
Zhang et al.

(10) Patent No.: US 12,505,731 B2
(45) Date of Patent: Dec. 23, 2025

(54) METHOD AND A SYSTEM FOR IMPROVING ALARM RELIABILITY OF SMOKE FIRE DETECTOR

(71) Applicant: BENGBU EI FIRE ELECTRONICS CO., LTD., Bengbu (CN)

(72) Inventors: Hongying Zhang, Bengbu (CN); Zhenfei Han, Bengbu (CN); Jianjun Wang, Bengbu (CN); Guangbiao Zhang, Bengbu (CN); Chao Jin, Bengbu (CN); Hongchi Ma, Bengbu (CN); Shuai Hao, Bengbu (CN)

(73) Assignee: BENGBU EI FIRE ELECTRONICS CO., LTD., Bengbu (CN)

( * ) Notice: Subject to any disclaimer, the term of this patent is extended or adjusted under 35 U.S.C. 154(b) by 0 days.

(21) Appl. No.: 18/732,855

(22) Filed: Jun. 4, 2024

(65) Prior Publication Data

US 2025/0029479 A1 Jan. 23, 2025

(30) Foreign Application Priority Data

Jul. 20, 2023 (CN) ........................ 202310895555.6

(51) Int. Cl.
*G08B 29/26* (2006.01)
*G08B 17/107* (2006.01)

(52) U.S. Cl.
CPC .......... *G08B 29/26* (2013.01); *G08B 17/107* (2013.01)

(58) Field of Classification Search
CPC ............................ G08B 29/26; G08B 17/107
USPC ........................................................ 340/506
See application file for complete search history.

(56) References Cited

FOREIGN PATENT DOCUMENTS

| | | | | | |
|---|---|---|---|---|---|
| CN | 112461722 A | * | 3/2021 | ............. | G01N 15/06 |
| CN | 113362560 B | * | 3/2022 | ........... | G08B 17/103 |
| CN | 114495409 A | * | 5/2022 | ............. | G08B 29/26 |
| CN | 117831217 A | * | 4/2024 | ........... | G08B 29/188 |
| CN | 114495409 B | * | 7/2024 | ............. | G08B 29/26 |
| CN | 118506548 A | * | 8/2024 | ............. | G08B 17/10 |
| CN | 118522112 A | * | 8/2024 | ........... | G08B 21/182 |
| CN | 119007378 A | * | 11/2024 | ........... | G08B 17/117 |
| CN | 119479179 A | * | 2/2025 | ........... | G08B 21/182 |
| UA | 155227 U | * | 1/2024 | | |

* cited by examiner

*Primary Examiner* — Brian A Zimmerman
(74) *Attorney, Agent, or Firm* — Hawaii Patent Services; Nathaniel K. Fedde; Kenton N. Fedde

(57) ABSTRACT

The present invention discloses a method and a system for improving the alarm reliability of a smoke fire detector. The method comprises the following steps: S1, Set an updated background threshold, an alarm threshold and an aerosol type threshold. S2, Initialize the background value of the smoke detector. S3, Regularly update the detection value. S4, Regularly update the long-period background value. S5, Update the short-period background value according to the threshold method. S6, Identify the aerosol type. S7, Give an alarm of fire smoke alarm. S8, Give an alarm of interfering substances.

8 Claims, 1 Drawing Sheet

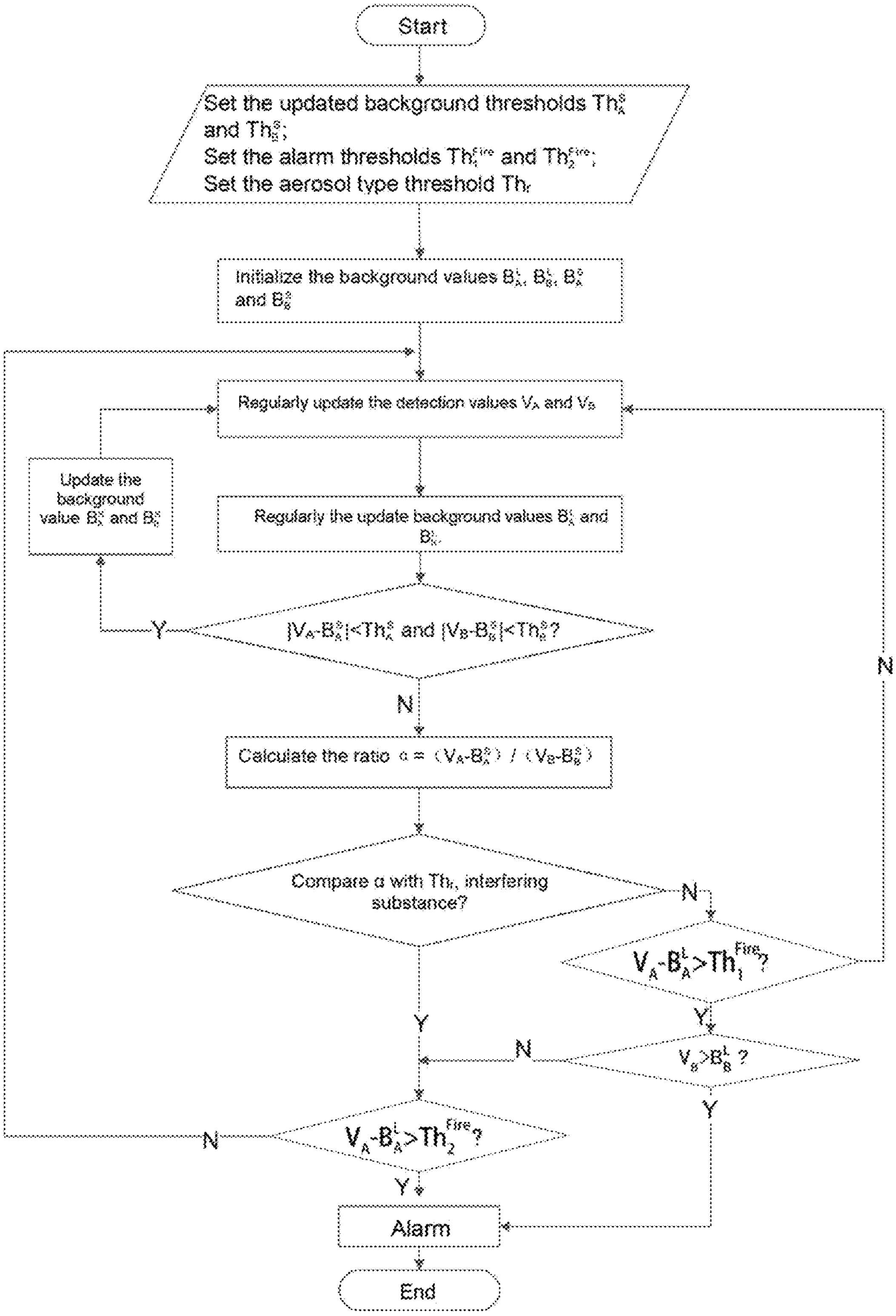
Start
Set the updated background thresholds Th_A^S and Th_B^S;
Set the alarm thresholds Th_1^Fire and Th_2^Fire;
Set the aerosol type threshold Th_r
Initialize the background values B_A^L, B_B^L, B_A^S and B_B^S
Regularly update the detection values V_A and V_B
Regularly the update background values B_A^L and B_B^L.
Update the background value B_A^S and B_B^S
|V_A-B_A^S|<Th_A^S and |V_B-B_B^S|<Th_B^S?
Y
N
Calculate the ratio α = (V_A-B_A^S) / (V_B-B_B^S)
Compare α with Th_r, interfering substance?
N
Y
V_A-B_A^L>Th_1^Fire?
N
Y
V_B>B_B^L ?
N
Y
V_A-B_A^L>Th_2^Fire?
N
Y
Alarm
End

METHOD AND A SYSTEM FOR IMPROVING ALARM RELIABILITY OF SMOKE FIRE DETECTOR

INCORPORATION BY REFERENCE

This application claims the benefit of priority from China Patent Application No. 202310895555.6 filed on Jul. 20 2023, the contents of which are hereby incorporated by reference in their entirety.

FIELD OF THE INVENTION

The present invention involves the field of fire alarm invention and discloses a method and a system for improving the alarm reliability of a smoke fire detector.

BACKGROUND OF THE INVENTION

In the automatic fire alarm system, the photoelectric smoke detector is the most used fire trigger device. The basic principle of photoelectric smoke detector is that when fire smoke particles in the air enter the detector maze, so that the detection light in the maze will be scattered and hit on the photoelectric tube, so as to generate an electrical signal. Interfering substances, such as water mist, dust, oil fume, etc., will also cause the scattering of detection light after entering the detector maze, leading to a false fire alarm of the detector. In order to solve this kind of problem, the current mainstream solution is to identify interfering substances by using the bidirectional scattering or dual spectrum detection technology, and adopt false alarm prevention strategies such as increasing the number of judgments and setting a high alarm threshold.

Generally, the background value of the detector will be recorded in the smoke detector, that is, the detection value in the smokeless state. The scatter light power of aerosol can be characterized by the difference between the real-time detection value of the detector and the background value. Because the true background of the detector will change slowly under the influence of dust accumulation in maze, photoelectric tube attenuation and other factors, the detector will usually update the background value regularly. In addition, in order to detect the slowly spreading fire, it is not suitable to set the update frequency of the detector background value to be too high. The typical update mode is once every 4 hours, with the weight of the real-time detection value of * and the overall update period of 32 hours. However, because the speed of the above-mentioned updating method is relatively slow, the background value of the detector will change greatly under the conditions of rapid temperature and humidity changes when turning on the air conditioner and opening the window for ventilation, resulting in great errors in calculating the scatter light power of aerosol and reducing the reliability of the detector alarm.

In order to accurately calculate the scatter light power ratio of aerosol, the invention patent with the application number of CN202110423292.X discloses a smoke detection method with low false alarm rate. Firstly, the unit average increment is calculated by using the sliding window derivation method, and then the scatter light power ratio of aerosol is calculated by using the unit average increment. Its essence is to take the detection value at a certain moment before the current sampling point as the benchmark for calculating the difference. The disadvantage of this method is that it is easy to generate large errors when the smoke concentration changes slowly and the unit average increment is small.

SUMMARY OF THE INVENTION

The present invention aims to provide a method and a system for improving the alarm reliability of a smoke fire detector.

The purpose of the present invention can be achieved by the following technical solutions:

A method for improving the alarm reliability of smoke fire detectors, which is applied to smoke detectors with dual spectrum or bidirectional scattering design. The method comprises the following steps:

S1, Set an updated background threshold, an alarm threshold and an aerosol type threshold. The updated background thresholds include the updated long-period background thresholds of the optical detection path A and optical detection path B, which are respectively marked as $Th_A^L$ and $Th_B^L$, and updated short-period background thresholds, which are respectively marked as $Th_A^S$ and $Th_B^S$. The alarm thresholds include the fire smoke alarm threshold $Th_1^{Fire}$ and interfering substance alarm threshold $Th_2^{Fire}$. The aerosol type threshold includes the scatter light power ratio threshold $Th_r$ for identifying aerosol types.

S2, Initialize the background value of the smoke detector.

S3, Regularly update the detection value.

S4, Regularly update the long-period background value.

S5, Update the short-period background value according to the threshold method. Judge whether the absolute differences between the real-time detection values $V_A$ and $V_B$ of the two optical detection paths and the respective short-period background values BAS and BBS are greater than the corresponding updated short-period background thresholds $Th_A^S$ and $Th_B^S$; and if so, proceed to Step S6. Otherwise, update the short-period background values $B_A^S$ and $B_B^S$, and return to Step S3.

S6, Identify the aerosol type. Calculate the scatter light power ratio a of aerosol, and judge whether a is less than $Th_r$ or not; if yes, identify the aerosol type as fire smoke, proceed to Step S7. Otherwise, identify the aerosol type as an interfering substance, proceed to Step S8.

S7, Give an alarm of fire smoke alarm. Judge whether the difference between the real-time detection value $V_A$ of the optical detection path A and the updated long-period background threshold $Th_A^L$ is greater than the fire smoke alarm threshold $Th_1^{Fire}$. If yes, continue to judge whether the real-time detection value $V_B$ of the optical detection path B is greater than the updated long-period background threshold $Th_B^L$; and if also yes, give an alarm. Otherwise, proceed to Step S8.

S8, Give an alarm of interfering substances. Judge whether the difference between the real-time detection value $V_A$ of the optical detection path A and the updated long-period threshold $Th_A^L$ is greater than the interfering substance alarm threshold $Th_2^{Fire}$; if yes, give an alarm.

As a further solution of the present invention, Step S3 includes: the smoke detector periodically collects the photoelectric signal intensity of the optical detection path A and optical detection path B, and converts them into numerical values, which are respectively marked as $V_A$ and $V_B$.

As a further solution of the present invention, Step S4 includes: periodically obtain the real-time detection value of the optical detection path, and obtain the weighted sum by using the real-time detection value and the historical background value, and the weight of the real-time detection value and the historical background value is ⅛ and ⅞, respectively.

As a further solution of the present invention, the calculation formula of a in Step S6 is shown below:

$$\alpha = \frac{V_A - B_A^S}{V_B - B_B^S}.$$

As a further solution of the present invention, if the difference between the real-time detection value $V_A$ of the optical detection path A and the updated long-period background threshold $Th_A^L$ obtained in Step S7 is greater than the fire smoke alarm threshold $Th_1^{Fire}$, return to Step S3.

As a further solution of the present invention, if the difference between the real-time detection value $V_A$ of the optical detection path A and the updated long-period threshold $Th_A^L$ obtained in Step S8 is greater than the interfering substance alarm threshold $Th_2^{Fire}$, return to Step S3.

The present invention also discloses a system for improving the alarm reliability of the smoke fire detector, which includes a threshold setting module, an initialization module, a detection module, a background value updating module, an aerosol identification module and an alarm module.

A threshold setting module for setting an updated background threshold, an alarm threshold and an aerosol type threshold.

An initialization module for initializing the background value.

A detection module for regularly updating the detection value.

A background value updating module for updating the long-period background value and the short-period background value.

An aerosol identification module for identifying the aerosol type.

An alarm module for giving the fire smoke alarm and interfering substance alarm.

The present invention has at least one of the following beneficial effects:

(1) The method mentioned in the present invention separates the background value of calculated scatter light power ratio of aerosol from the background value of decision-making alarm, which are respectively called short-period background value and long-period background value, and adopts different background value updating mechanisms to adapt to the influence of fast-changing factors and slow-changing factors respectively, so that the scatter light power ratio of aerosol can be calculated more accurately and the identification results are more reliable compared with the existing method for calculating the scatter light power ratio of aerosol and decision-making alarm depending on the same background value;

(2) By adopting a short-period background value updating mode judged based on threshold, the method of the present invention occupies less storage space and can accurately calculate the scatter light power ratio of aerosol for aerosol fire smoke compared with the existing sliding window derivation method and others, so that the recognition result is more reliable;

(3) When making fire alarm decision, the method of the present invention will consider the changing trend of the signal intensity of the two optical detection paths of the detector, that is, it will raise the alarm threshold when the changing trends of detection values of the two optical detection paths are inconsistent and give an alarm of interfering substances, which can effectively reduce the false alarm of the detector caused by condensation inside the maze.

BRIEF DESCRIPTION OF DRAWINGS

The present invention will be further described with reference to the drawings.

FIG. 1 shows a schematic flow chart of the method for improving the alarm reliability of smoke fire detectors proposed in the present invention.

DETAILED DESCRIPTION

The technical solution in the embodiment of the present invention will be clearly and completely described below with reference to the drawings in the embodiment of the present invention. Obviously, the described embodiments only refer to a part of the embodiment in the present invention and not all embodiments. Based on the embodiment of the present invention, all other embodiments obtained by the ordinary technical personnel in the field without making creative work fall within the scope of the protection of the present invention.

According to FIG. 1, the present invention discloses a method for improving the alarm reliability of smoke fire detectors, which is applied to smoke detectors with dual spectrum or bidirectional scattering design. Specifically, the smoke detector includes two optical detection paths, and the optical detection path with smaller change of detection value in smokeless state when conditions such as ambient temperature and humidity change is marked as A and the corresponding other optical detection path is marked as B.

The method includes the following steps:

S1, Set an updated background threshold, an alarm threshold and an aerosol type threshold. The updated background thresholds include the updated long-period background thresholds of the optical detection path A and optical detection path B, which are respectively marked as $Th_A^L$ and $Th_B^L$, and updated short-period background thresholds, which are respectively marked as $Th_A^S$ and $Th_B^S$. The alarm thresholds include the fire smoke alarm threshold $Th_1^{Fire}$ and interfering substance alarm threshold $Th_2^{Fire}$. The aerosol type threshold includes the scatter light power ratio threshold $Th_r$ for identifying aerosol types.

S2, Initialize the background value of the smoke detector. The initial background value mentioned includes the initialized long-period background values of the optical detection path A and optical detection path B, which are respectively marked as $B_A^L$ and $B_B^L$, and the initialized short-period background values, which are respectively marked as $B_A^S$ and $B_B^S$; The way of initializing the background value is to take the detection value stored by the smoke detector in the smokeless state as the initial value.

S3, Regularly update the detection value. The updated detection value mentioned refers to the numerical values converted by that the smoke detector from the photoelectric signal intensity of the optical detection path A and optical detection path B periodically collected by the smoke detector, which are respectively marked as $V_A$ and $V_B$.

S4, Regularly update the long-period background value. The long-period background value mentioned includes the long-period background value $B_A^L$ of the optical detection path A and $B_B^L$ of optical detection path B. The long-period background value is updated at a lower frequency and a smaller increments. The typical update method is to update them every 4 hours, and obtain the weighted sum by using the real-time detection value and the historical background value, and the weight of the real-time detection value and the historical background value is ⅛ and ⅞, respectively;

S5, Update the short-period background value according to the threshold method. Judge whether the absolute differences between the real-time detection values $V_A$ and $V_B$ of the two optical detection paths and the respective short-period background values $B_A^S$ and $B_B^S$ is greater than the corresponding updated short-period background thresholds $Th_A^S$ and $Th_B^S$; and if so, proceed to Step S6. Otherwise, update the short-period background values $B_A^S$ and $B_B^S$, and return to Step S3.

S6, Identify the aerosol type. Calculate the scatter light power ratio a of aerosol, and judge whether a is less than $Th_r$ or not; if yes, identify the aerosol type as fire smoke, proceed to Step S7. Otherwise, identify the aerosol type as an interfering substance, proceed to Step S8. The calculation formula of a is shown below:

$$\alpha = \frac{V_A - B_A^S}{V_B - B_B^S}.$$

S7, Give an alarm of fire smoke alarm. Judge whether the difference between the real-time detection value $V_A$ of the optical detection path A and the updated long-period background threshold $Th_A^L$ is greater than the fire smoke alarm threshold $Th_1^{Fire}$. If yes, continue to judge whether the real-time detection value $V_B$ of the optical detection path B is greater than the updated long-period background threshold $Th_B^L$; and if also yes, give an alarm. Otherwise, proceed to Step S8. If the difference between the real-time detection value $V_A$ of the optical detection path A and the updated long-period background threshold $Th_A^L$ is greater than the fire smoke alarm threshold $Th_1^{Fire}$, Return to Step S3.

S8, Give an alarm of interfering substances. Judge whether the difference between the real-time detection value $V_A$ of the optical detection path A and the updated long-period threshold $Th_A^L$ is greater than the interfering substance alarm threshold $Th_2^{Fire}$; if yes, give an alarm. If the difference between the real-time detection value $V_A$ of the optical detection path A and the updated long-period threshold $Th_A^L$ is greater than the interfering substance alarm threshold $Th_2^{Fire}$, return to Step S3.

The method mentioned in the present invention separates the background value of calculated scatter light power ratio of aerosol from the background value of decision-making alarm, which are respectively called short-period background value and long-period background value, and adopts different background value updating mechanisms to adapt to the influence of fast-changing factors and slow-changing factors respectively, so that the scatter light power ratio of aerosol can be calculated more accurately and the identification results are more reliable compared with the existing method for calculating the scatter light power ratio of aerosol and decision-making alarm depending on the same background value;

By adopting a short-period background value updating mode judged based on threshold, the method of the present invention occupies less storage space and can accurately calculate the scatter light power ratio of aerosol for aerosol fire smoke compared with the existing sliding window derivation method and others, so that the recognition result is more reliable;

When making fire alarm decision, the method of the present invention will consider the changing trend of the signal intensity of the two optical detection paths of the detector, that is, it will raise the alarm threshold when the changing trends of the two optical detection paths are inconsistent and give an alarm of interfering substances, which can effectively reduce the false alarm of the detector caused by condensation inside the maze.

The present invention also discloses a system for improving the alarm reliability of the smoke fire detector, which includes a threshold setting module, an initialization module, a detection module, a background value updating module, an aerosol identification module and an alarm module.

A threshold setting module for setting an updated background threshold, an alarm threshold and an aerosol type threshold.

An initialization module for initializing the background value.

A detection module for regularly updating the detection value.

A background value updating module for updating the long-period background value and the short-period background value.

An aerosol identification module for identifying the aerosol type.

An alarm module for giving the fire smoke alarm and interfering substance alarm.

This system has the same beneficial effects as the above methods, and will not be repeated here.

An embodiment of the present invention has been described in detail above, which only represents a preferred embodiment of the present invention and cannot be considered as the general scope for implementation of the present invention. All similar changes and improvements made according to the application scope of the present invention fall within the coverage scope of patent of the present invention.

The invention claimed is:

1. A method for improving the alarm reliability of smoke fire detectors, which is applied to smoke detectors with dual spectrum or bidirectional scattering design, the method comprising the following steps:

S1, setting updated background thresholds, alarm thresholds and an aerosol type threshold; wherein the updated background thresholds mentioned include updated long-period background thresholds of an optical detection path A and an optical detection path B, which are respectively marked as $Th_A^L$ and $Th_B^L$, and updated short-period background thresholds, which are respectively marked as $Th_A^L$ and $Th_B^L$; wherein the alarm thresholds mentioned include a fire smoke alarm threshold $Th_1^{Fire}$ and an interfering substance alarm threshold $Th_2^{Fire}$; and wherein the aerosol type threshold mentioned includes a scatter light power ratio threshold $Th_r$ for identifying aerosol types;

S2, initializing a background value of the smoke detector;

S3, regularly updating a detection value;

S4, regularly updating a long-period background value;

S5, updating a short-period background value according to a threshold method;

Judge judging whether the absolute differences between real-time detection values $V_A$ and $V_B$ of the two optical detection paths and respective short-period background values $B_A^S$ and $B_B^S$ are greater than the corresponding updated short-period background thresholds $Th_A^S$ and $Th_B^S$; and if so, proceeding to Step S6; Otherwiseotherwise, update updating the short-period background values $B_A^S$ and $B_B^S$, and returning to Step S3;

S6, identifying an aerosol type; calculating the scatter light power ratio a of an aerosol, and judge judging whether a is less than $Th_r$ or not; if yes, identifying the aerosol type as fire smoke, proceeding to Step S7; otherwise, identifying the aerosol type as an interfering substance, proceed to Step S8;

S7, Giving giving an alarm of fire smoke alarm; judging whether the difference between the real-time detection value $V_A$ of the optical detection path A and the updated long-period background threshold $Th_A^L$ is greater than the fire smoke alarm threshold $Th_1^{Fire}$; if yes, continue continuing to judge whether the real-time detection value $V_B$ of the optical detection path B is greater than the updated long-period background threshold $Th_B^L$; and if also yes, giving an alarm; otherwise, proceeding to Step S8; and S8, Giving giving an alarm of interfering substances; judging whether the difference between the real-time detection value $V_A$ of the optical detection path A and the updated long-period threshold $Th_A^L$ is greater than the interfering substance alarm threshold $Th_2^{Fire}$, if yes, giving an alarm.

2. The method for improving the alarm reliability of smoke fire detectors according to claim 1, wherein is characterized in that the a detection value stored by smoke detectors in smokeless state is taken as the initial background value in Step S2; the initial background value mentioned includes the initialized long-period background values of the optical detection path A and optical detection path B, which are respectively marked as $B_A^L$ and $B_B^L$, and the initialized short-period background values, which are respectively marked as $B_A^S$ and $B_B^S$.

3. The method for improving the alarm reliability of smoke fire detectors according to claim 1, wherein is characterized in that step S3 includes: periodically collecting, via the smoke detector, periodically collects the photoelectric signal intensity of the optical detection path A and optical detection path B, and converts converting the photoelectric signal intensity of the optical detection path A and optical detection path B into numerical values, which are respectively marked as $V_A$ and $V_B$.

4. The method for improving the alarm reliability of smoke fire detectors according to claim 1, wherein is characterized in that Sstep S4 includes: periodically obtaining the real-time detection value of the optical detection path, and obtaining the weighted sum by using the real-time detection value and the historical background value, and the weight of the real-time detection value and the historical background value is ⅛ and ⅞, respectively.

5. The method for improving the alarm reliability of smoke fire detectors according to claim 1, wherein is characterized in that the calculation formula of a is shown below in Step S6:

$$\alpha = \frac{V_A - B_A^S}{V_B - B_B^S}.$$

6. The method for improving the alarm reliability of smoke fire detectors according to claim 1, wherein is characterized in that if the difference between the real-time detection value $V_A$ of the optical detection path A and the updated long-period background threshold $Th_A^L$ obtained in Step S7 is greater than the fire smoke alarm threshold $Th_1^{Fire}$, returning to Step S3.

7. The method for improving the alarm reliability of smoke fire detectors according to claim 1, wherein is characterized in that if the difference between the real-time detection value $V_A$ of the optical detection path A and the updated long-period threshold $Th_A^L$ obtained in Step S8 is greater than the interfering substance alarm threshold $Th_2^{Fire}$, returning to Step S3.

8. A method for improving alarm reliability of smoke fire detectors is characterized by comprising:

A threshold setting module for setting an updated background threshold, an alarm threshold and an aerosol type threshold;

An initialization module for initializing a background value;

A detection module for regularly updating a detection value;

A background value updating module for updating a long-period background value and a short-period background value;

identifying an aerosol type; and giving a fire smoke alarm and an interfering substance alarm.

* * * * *